Oct. 23, 1928.

D. M. WINANS 1,689,181

OIL CHANGE RECORDER

Filed April 29, 1927

DANIEL M. WINANS INVENTOR.

BY Louis Illmer

ATTORNEY

Patented Oct. 23, 1928.

1,689,181

UNITED STATES PATENT OFFICE.

DANIEL M. WINANS, OF BINGHAMTON, NEW YORK, ASSIGNOR TO THE BREWER-TITCHENER CORPORATION, OF CORTLAND, NEW YORK, A CORPORATION OF NEW YORK.

OIL-CHANGE RECORDER.

Application filed April 29, 1927. Serial No. 187,454.

This invention relates to registering devices and more particularly to improvement in manually operable dial plate reminding means adapted to be easily attached to the instrument board of a motor vehicle or the like and serving to register the car mileage at which it becomes expedient to renew depleted lubricating oil. Motorists generally fail to remember with certainty just when their crank-case oil was last replenished and lack of due precaution on this score, has frequently led to burning out of bearings and other serious motor troubles.

A distinctive feature of the device herein contemplated lies in the extreme simplicity of means used to accomplish the purpose intended; it essentially comprises a suitably shaped dial plate equipt with a series of aligned but spaced peek holes behind each of which is pivotally mounted a separate indexed disc having Arabic numerals but which as a unit allow of setting my recorder to the corresponding car odometer reading at which it is deemed desirable to change the engine crank-case oil. Each of said dials may be individually manipulated by hand and suitable latching means are provided for holding the respective discs in adjusted position against jolting or vibration of the car.

The dial face of my device also lends itself to the carrying of effective advertising script; a further object is to provide for a recorder of the character indicated that can be economically fabricated on a large scale production with a view of keeping the cost thereof down to a point where it is likely to find a wide and responsive market on part of the average car user.

To this end and the accomplishment of other new and useful results, the invention further consists in novel constructive features and arrangement of its several parts, all of which will hereinafter be more fully described.

Reference is had to the accompanying one sheet of drawings which is illustrative of a specific embodiment of my invention; like characters of reference indicate like parts, and in which drawings.

Figure 5:
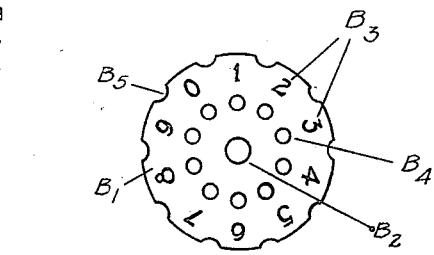

Fig. 5 details of one of my indexed discs.

Referring more particularly to said drawings, A denotes a flat recorder dial plate preferably made relatively long and provided with a series of longitudinally spaced peep holes or window-like port openings $A_1$, $A'_1$ etc., which in the present instance are confined to three such holes. Directly below each peep hole is provided a headed pintle or pivot pin such as $A_2$, $A'_2$ etc., respectively mounting the indexed discs $B_1$, $B'_1$ etc. in spaced non-intermeshing fashion. These pins may be riveted to project rearwardly of the dial A as is clearly shown in Fig. 4, but prior to securement, an indexed disc such as $B_1$ (see Fig. 5) having a centrally disposed bearing hole $B_2$ is rotatably but loosely mounted upon each of said pivot pins. A spring as $A'_4$ is made to bear under each pin head to resiliently hold its disc against the adjacent rear face of the dial plate A. The various indexed discs are intended to be spaced at a distance somewhat greater than their common outside diameter in order to allow each disc to be independently manipulated without interference. It will further be observed that the hole distance marked L as measured from the rectilinear bottom edge $A_5$ of the dial, is made smaller than the full disc radius and that the respective discs are made to partially overhang said edge to facilitate their manipulation.

In further reference to the details of disc $B_1$ for instance, the face intended to rest adjacent to the rear of the dial plate A is provided with numerical indices such as $B_3$ which are circumferentially disposed and run from nought to nine inclusive; set radially inward from each of these numerals, is a series of corresponding centering perforations or other socket means such as $B_4$. There is also provided a cooperating dowel pin $A_6$ for each of said discs that is shown as projecting rearwardly through the dial plate A; said dowel is intended to register with said series of disc perforations $B_4$ and successively engage therewith. Since each disc is loosely and slidably mounted along its pintle, the overhanging bottom edge thereof may readily be depressed inwardly toward the headed pintle end and away from the adjacent rear dial face into the tilted position shown by dotted lines in Fig. 4; the tilted disc is thereby withdrawn from its dowel $A_6$ and may now be freely rotated to change its numeral setting with respect to the corresponding peep hole. The rotative manipulation of each individual disc may be facilitated by means of the edge serrations such as $B_5$. Upon squarely bringing the disc to any desired reading, it may be released and thereupon the pintle spring cooperates with the dowel $A_6$ to latch and hold the disc into its registering centering perforation $B_4$ until it may again be desired to alter such recorded disc adjustment in a like fashion.

As will be obvious, the intent of said shiftable discs is to allow of setting the same into registry at the time of replenishing the crank-case oil and make the reading of the dial plate of my recorder respond to that of the prevailing car odometer plus whatever mileage rating it is preferred to ascribe to the particular lubricant being used. When the odometer reading reaches or overtakes such forward setting of my oil change recorder, this will serve as an effective reminder that the oil needs to be changed. My advice therefore affords suitable facilities for insuring that the motor oil shall be regularly renewed which in turn tends to materially extend the life of the motor.

In order to conveniently compare readings and keep track of the time when the odometer readings overtakes that of the advanced recorder setting, it is preferred to locate my device adjacent to the vehicle odometer. To this end, I preferably provided the dial plate A with U shaped or jaw type of bracket C having bifurcated bow-shaped supporting leg members such as $C_1$ and $C_2$ of which the respective ends straddle the various discs and are apertured for securement to the rear face of said plate by any suitable means, as by the shown rivets $C_3$.

Intermediate such leg ends, said bracket is further equipt with an integrally formed transverse web wall $C_4$ of which an upright extension member is fashioned into a screw post carrying complementary trough-shaped or winged portion $C'_4$ adapted to firmly grip and position the sides of a lock nut $C_5$. The upper post or jaw portion of the web wall $C_4$ is shown as perforated to allow the clamp screw $C_6$ to freely pass therethrough and this screw engages with the positioned nut $C_5$ as indicated.

Figure 2:
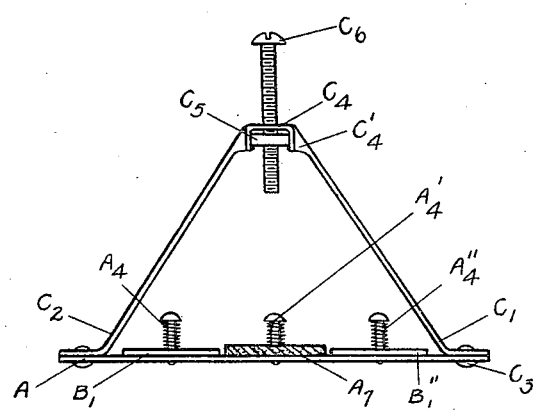
Fig. 2 represents a top view of Fig. 1 and Fig. 3 a bottom view thereof.
Figure 1:
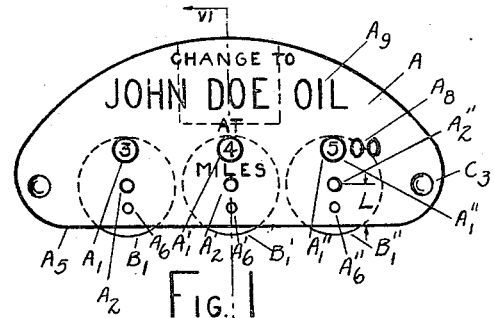
Fig. 1 is an elevational front or face view showing my assembled recorder dial plate as provided with three manipulative discs.
Figure 4:
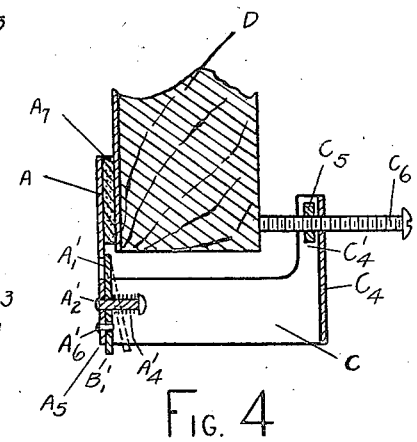
Fig. 4 shows an enlarged sectional view taken along lines IV—IV of Fig. 1 to better illustrate the assembly of dial parts as attached to an automobile instrument board.
Figure 3:
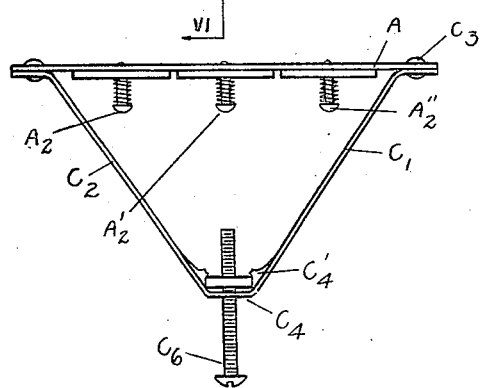

Opposite but longitudinally aligned with said clamp screw, is a protective cushioning pad $A_7$ preferably disposed midway along the upper rear edge of the dial plate as shown in Fig. 4. Said U shaped bracket C is intended to clamp underneath a reenforced instrument board D with the pad pressed against its trimmed front while the clamp screw $C_6$ is snugly drawn up against the rear face thereof to hold the described bracket structure in place.

The purpose and use of my device is thought to be apparent from the foregoing disclosure and it merely remains to point out that I am able to restrict the number of needed discs to three and still afford registry for the full reading of the car odometer up to 99,900 miles, this being accomplished by the use of a set of extra double dial plate ciphers designated as $A_8$ and which numerals may be located rightwardly and closely adjacent to the peep hole $A''$, for the purpose of multiplying hundredfold the collective readings that may be registered by said three peep holes.

As an embellishment intended to further the sale of my device, I have arranged for a rather wide dial face shape which affords room for a substantial amount of script of any kind such as that indicated by $A_9$. It will be obvious that the provision for such extended inscription space materially enhances the commercial outlet of my low price recording device as applied to advertising and similar purposes, the intent being to have oil refiners or the like arrange for inscribing their name on my device and gratuitously distribute the same among users of their products.

It will be understood that various changes in the details and arrangement of my device may be resorted to, all without departing from the spirit and scope of my invention hertofore described and more particularly pointed out in the appended claims.

Claims:—

1. In an oil change registering device comprising a dial plate equipt with a plurality of spaced peek holes, a separate individually manipulative disc provided with numerical indices pivotally mounted behind each such hole and adapted to selectively register a numeral therethrough for collectively fixing upon a definite recorded dial reading, each of said discs having a periphery portion disposed in overhanging relation to one edge of said plate and adapted to be manually tilted away from the adjacent face of said plate, spring means serving to independently urge the several discs toward said adjacent plate face, and separate latch means for each of the discs adapted to be disengaged by tilting said overhanging edge thereof.

2. In an oil change registering device comprising a dial plate equipt with a plurality of spaced peek holes, a separate individually manipulative disc provided with numerical indices pivotally mounted behind each such hole and adapted to selectively register a numeral therethrough for collectively fixing upon a definite recorded dial reading, each of said discs having a periphery portion disposed in overhanging relation to an edge of said plate and adapted to be manually tilted away from the adjacent face of the plate and each of said discs being further provided with a series of socket centering means respectively corresponding to the numerals thereon, and separate latch means for each of said discs, each such comprising a spring member urging its tiltable disc edge toward the adjacent plate face, and a centering dowel member projecting from said adjacent plate face for engagement with one of the several centering sockets of such manually released disc.

3. In an oil change registering device for motor vehicles having an instrument board, said device comprising a dial plate equipt with a plurality of spaced peek holes and which plate is provided with a clamping region remotely disposed with respect to said holes and adapted to be clamped in overlapping relation to one of the marginal face portions of said board, a separate individually manipulative disc provided with numeral indices pivotally mounted behind each of such holes upon the board engaging side of said plate serving to selectively register a numeral therethrough, and a bracket member comprising bifurcated supporting legs respectively adjoined to the disc carrying side of said plate while the interconnecting leg crotch portion thereof extends underneath and around the adjacent edge of said board, said crotch being equipt with a transversely disposed yoke-like member provided with screw means adapted to bear against the opposite face of said board for plate clamping purposes.

In testimony whereof, I have herewith set my hand this 26th day of April, 1927.

DANIEL M. WINANS.